(12) United States Patent
Czaja et al.

(10) Patent No.: US 8,989,820 B2
(45) Date of Patent: Mar. 24, 2015

(54) METHOD FOR SUSPENDING TRANSMISSION AND RECEPTION OF TEXT MESSAGES AND PHONE CALLS

(75) Inventors: Stanislaw Czaja, Cardiff, CA (US); Ilona Stawski, Avon Lake, OH (US); Muhammad Afsar, San Diego, CA (US); Byung K. Yi, San Diego, CA (US)

(73) Assignee: IPComm, Cardiff, CA (US)

( * ) Notice: Subject to any disclaimer, the term of this patent is extended or adjusted under 35 U.S.C. 154(b) by 306 days.

(21) Appl. No.: 13/523,693

(22) Filed: Jun. 14, 2012

(65) Prior Publication Data

US 2012/0252420 A1   Oct. 4, 2012

Related U.S. Application Data

(63) Continuation-in-part of application No. 13/244,534, filed on Sep. 25, 2011.

(60) Provisional application No. 61/412,075, filed on Nov. 10, 2010.

(51) Int. Cl.
*H04M 1/00* (2006.01)
*H04W 48/04* (2009.01)

(52) U.S. Cl.
CPC ................................ *H04W 48/04* (2013.01)

USPC .................. 455/569.2; 455/552.1; 455/456.1; 455/550.1; 455/569.1

(58) Field of Classification Search
USPC ........... 455/552.1, 456.1, 550.1, 569.1, 569.2
See application file for complete search history.

(56) References Cited

U.S. PATENT DOCUMENTS

| | | | |
|---|---|---|---|
| 8,401,589 B2 * | 3/2013 | Liu et al. .................... | 455/552.1 |
| 8,428,973 B1 * | 4/2013 | Hopkins, III ..................... | 705/4 |
| 2010/0197351 A1 * | 8/2010 | Ewell et al. .................... | 455/565 |
| 2010/0216509 A1 * | 8/2010 | Riemer et al. ................ | 455/557 |
| 2012/0040665 A1 * | 2/2012 | Liu et al. .................... | 455/426.1 |
| 2012/0289217 A1 * | 11/2012 | Riemer et al. ................ | 455/418 |

* cited by examiner

*Primary Examiner* — Fayyaz Alam

(57) ABSTRACT

The present invention relates to the field of wireless communication and specifically the use of a cell-phone to monitor safe driving by suspending transmission or reception of text messages and/or phone calls by the driver of the moving motor vehicle not equipped with the hands-free equipment, or complete suspension of such communication to the operator of a train while the train is in motion, unless such transmissions are related to emergency services and where the determination of the vehicle operator status as well as operation terms-and-conditions may be obtained by including such info in the vehicle QR code or NFC or Bluetooth or other PAN transceivers combined with the interaction of the cell-phone based application.

11 Claims, 5 Drawing Sheets

METHOD FOR SUSPENDING TRANSMISSION AND RECEPTION OF TEXT MESSAGES AND PHONE CALLS

RELATED U.S. APPLICATION

This application is Continuation in Part of non-provisional application Ser. No. 13/244,534 titled "Method for Suspending Transmission and Reception of Text Messages and Phone Calls while Driving" filled on Sep. 25, 2011, which claims the priority under the 35 U.S.C. section 119 of Provisional Application No. 61/412,075 entitled "METHOD AND APPARATUS PROHIBITING TEXT MESSAGES WHILE DRIVING'", filled on Nov. 10, 2010, which is assigned to the assignee hereof and hereby expressly incorporated by reference herein.

FIELD OF THE INVENTION

The present invention relates to the field of wireless communication and specifically to use of a cell-phone to monitor safe driving habits by suspending transmission and reception of text messages (SMS) and phone calls by the operator of a car, train, etc. not equipped with the hands-free equipment unless such transmission is related to emergency services.

BACKGROUND

The danger associated with sending or receiving text messages (SMS, MMS), or voice calls while driving is well known and documented and against the law in most states.

Many studies show that while legally intoxicated person traveling at 70 mph applies brakes on average 4 feet beyond the baseline, a sober person receiving text message applies brakes on average 36 feet beyond the baseline, and while sending text message, on average 70 feet beyond the baseline.

According to National Transport Safety Board (NTSB) statistic, in year 2011, more than 3000 lives was lost in US due to the accidents caused by drivers distracted with sending or receiving text messages, or engaged in phone conversation while driving. Also several deadly train accidents were accredited to the fact that the train operator was actively involved in SMS transmission prior to the accident.

However, regardless of those statistics, 66% of the respondents of 2007 Harris Interactive poll admitted that they text while driving. Those numbers are even higher among the youngest drivers who already are higher in their share of road accidents. As such, method for automatic detection that the user of the mobile terminal is in a moving vehicle not equipped with the hands-free device while performing the function of a driver may save many thousands of lives.

SUMMARY OF THE INVENTION

The proposed invention will suspend transmission or reception of text messages and/or phone calls by the driver of the moving motor vehicle not equipped with the hands-free equipment, or complete suspension of such communication to the operator of a train while the train is in motion unless such transmissions are related to emergency services.

This functionality is achieved by determining that the user is in a moving vehicle (by one of several method describe below and in detailed embodiments), and that he/she actively operating such vehicle.

Determination of vehicle motion can be achieved either by the mobile terminal or by the cellular network or by combination of above, by observing the output of the channel estimation function to determine the shift in the Doppler frequency of the received signal which happens to be proportional to the vehicle speed.

Velocity of the vehicle may be obtained by mobile terminal through the observation of changes in the acceleration vector of the MEMS (Microelectromechanical System) accelerometer. Such MEMS accelerometers are common devices embedded in most of the smart-phones to enhance UI (User Interface) experience—such as screen orientation, improved navigation, etc.

The status of the vehicle operator may be obtained implicitly through the interaction with the user—for example, request conformation through terminal UI when the velocity is greater than 3 mph; signing contract (or registering presence) by scanning of the Quick Response (QR) code attached to the vehicle, or explicitly by associating the position of the terminal with the proximity detector, such as the NFC or Bluetooth transceiver; or by using the mobile terminal camera.

Depending on the user profile, each time SMS or non-emergency call is sent or received and the vehicle is in motion, a status of such communication including time and location is recorded. Such status may be sent automatically to the pre-determined recipients (for example: parents, insurance provider, fleet/train supervisor, etc.), using mobile terminal SMS service or downloaded later upon request.

In addition, by observing an output of terminal accelerometer, an accident (shock due to an impact recorded as acceleration with non-periodic characteristics), is to be detected. In such instance, the speed of the vehicle, location call and vehicle operator status is recorded. Depending on the user profile, such information may be sent to the predefined recipients, such as: parents, insurance provider, police, fleet supervisor, etc. or uploaded later upon request.

Such a monitoring system can operate using any of wireless WAN technology such as: cdma2000 (1xRTT and EV-DO), UMTS, LTE, WiMax, etc.

Various embodiments for monitoring the driver safety status are presented.

In one embodiment, the MEMS accelerometer embedded within the mobile terminal measure vehicle velocity as velocity—expressed in meters per second (m/s), comprises both, direction and the rate of displacement, or acceleration—expressed in meters per second squared (m/s$^2$). An example of such embodiment is presented in FIG. 1 and FIG. 2.

In such embodiment, the status of the hands-free function is known to the mobile terminal through the process known as association at the time the mobile terminal moves within the range of hands-free equipment or other local (to the vehicle) communication network, such as near field communication (NFC) When the vehicle is operated under certain terms (i.e. insurance contract limiting use of communication equipment while actively controlling the vehicle, or law prohibiting such communication, etc.), the user may be required to scan a QR code attached to the vehicle to acknowledge such terms, which may be used to unlock the vehicle and/or enable start of the engine. Alternatively, such terms and conditions may be precoded inside the PAN transceiver (such as: NFC, Bluetooth, etc.) RAM. An example of such embodiment is presented in FIG. 3.

When the vehicle speed is detected, mobile terminal verifies status of the vehicle operator, either by reading previously stored status, if such status flag equals "valid" or, if operator status equals "not-valid" (previously registered driver become a passenger, etc.), by sending driver status conformation message to the mobile terminal UI.

If the vehicle is a fleet vehicle (rental car, commercial truck, etc.) the vehicle operator may be required to scan QR code attached to the vehicle or inside NFC, Bluetooth, etc. transceiver RAM, such code or memory content, can perform several functions, among the others: 1) provide link for downloading of the application in case safe driving application is not already installed on user mobile device; 2) provide user with the terms and conditions under which he/she agrees to operate such vehicle. When such terms are explicitly accepted the application is activated.

If the vehicle is a train, etc. upon entrance to the control compartment, the operator may be required to scan QR code, thus accepting safety regulations. If the operator's compartment is equipped with local wireless transceiver or access point (AP), the operator's mobile terminal will activate such local AP which in turn may control all communication while the train is in motion. If such operator compartment is not equipped with such AP, the application residing on the operator's mobile terminal will suspend all communication, except E911 and other precoded emergency numbers when such train is in motion.

The operator status becomes "valid" after the mobile terminal detects that the velocity is above the "drive" threshold and verifies through the terminal UI that the user is not actively driving a car. The operator status becomes "non-valid" when the mobile terminal detects that the vehicle was stopped and re-started again (possible change of the operator), If the vehicle is a car, for each outgoing SMS or voice communication (user originated), and when the hands-free function is active, or the hands-free is inactive but the user is not an active driver, communication is allowed without any restriction. Otherwise, if the user is an active driver, but the communication is not intended for emergency (for example E911), communication is disallowed and an audio and text messages are sent to the mobile terminal UI informing of restriction.

If the vehicle is a car, for each incoming SMS or voice communication (user terminated), and if the hands-free function is active, or the hands-free is inactive but the user is not an active driver, communication is allowed without any restriction. Otherwise, if the user is an active driver, but the communication is not intended for emergency (for example: Reverse E911, Emergency Broadcast, etc.), communication is disallowed without any notification to the user (rings, etc. is suspended with "busy" signal indication and the incoming communication is redirected to the user mail-box.

When an accident is detected (measured as an instantaneous change in acceleration with non-periodic characteristics which exceeds a predefined threshold), speed of the vehicle, it's location and call status (was the vehicle operator in active communication) is recorded and depending on the user profile, such information is sent to the predefined recipients or stored in mobile terminal memory for later evaluation.

In another embodiment, the velocity of the vehicle can be obtained by the wireless network serving base station (BS), through the observation of Doppler frequency shift in the user mobile terminal uplink communication channel. Since wireless channel in which mobile network operates is inherently prone to many distortions, such as: attenuation, dispersion, multipath, Raileigh fading, Doppler fading, etc. Estimation of such distortion is essential to the operation of the BS and each mobile terminal.

Part of this distortion is due to the signal constellation shift induced by the terminal movement when the transmitted frequency $f_0$ is received (by a moving terminal) at frequency $f_0+f_d$. This change in frequency $f_d$ is known as Doppler shift and it is proportional to the speed of the terminal and expressed as:

$$f_d = -2f_0/c = -2v_r/\lambda.$$

In such embodiment, after determining the speed of the vehicle, the BS scheduler can verify user hands-free and driver status from the previously stored state, and if such status flag equals "valid" or, if driver status equals "not-valid" by sending hands-free and driver status request message(s) to the user mobile terminal. If the returned hands-free status and driver status are negative (hands-free is active or user is not the active driver), the BS may route the call to the mobile terminal, otherwise, the BS will direct the incoming call to the user mail box.

Similarly, when the BS detects the mobile terminal access probe (user attempts to place a call), while determining the user originating such call is in a moving vehicle, it may verify user hands-free and driver status from the previously stored state, if such status flag equals "valid" or, if driver status equals "not-valid" by sending hands-free and driver status request message(s) to the user mobile terminal. If the returned hands-free status and driver status are negative (hands-free is active or user is not the active driver), the BS may terminate call (route to the destination), otherwise, the BS will reject to set-up the call and may send message to the user mobile terminal UI indicating of restrictions.

In yet another embodiment, the velocity of the vehicle can be obtained by the mobile terminal through the observation of Doppler frequency shift in the transmitting BS downlink communication channel Such measurement is readily available at the output of mobile terminal channel estimation function. An example of such embodiment is presented in FIG. 4.

When mobile terminal power is turn ON, the terminal sends communication request message, such as Access Probe, etc. to the communication network. When the terminal is authenticated, it must periodically report various measurements, even when no active communication is performed (frequently referred as Idle State). As such, both the mobile terminal and the communication network are able to determine the vehicle velocity by observing the output of the channel estimation function. And is the velocity exceeds pedestrian speed, for example 3 km/h, the network and terminal may exchange messages to obtain vehicle operator status.

In such embodiment, the status of the hands-free function is known to the mobile terminal through the process known as association at the time it moves within the range of such equipment. When the vehicle speed is detected, mobile terminal verifies status of the vehicle driver, either by reading previously stored status, if such status flag equals "valid" or, if driver status equals "not-valid" by sending driver status conformation message to the mobile terminal UI.

For an outgoing SMS or voice communication (user originated), and if hands-free function is active, or the hands-free is inactive but the user is not an active driver, communication is allowed without any restriction. Otherwise, if the user is an active driver, but the communication is not intended for emergency (for example E911), communication is disallowed and an audio and text messages are sent to the mobile terminal UI informing of restriction.

For an incoming SMS or voice communication (user terminated), and if hands-free function is active, or the hands-free is inactive but the user is not an active driver, communication is allowed without any restriction. Otherwise, if the user is an active driver, but the communication is not intended for emergency (for example: Reverse E911, Emergency Broadcast, etc.), communication is disallowed without any notification to the user (rings, etc. is suspended with "busy" signal indication and the incoming communication is redirected to the user mail-box.

In all of the mentioned embodiments, the monitoring application records the event of text and/or voice communication including time and location when the driver status was set to "non-active driver", and depending on the user profile, such information is sent to the predefined recipients or stored for later evaluation.

BRIEF DESCRIPTION OF THE DRAWINGS

A better understanding of the present invention can be obtained when the following detailed description of the preferred embodiment is considered in conjunction with the following drawings, in which.

Figure 1:
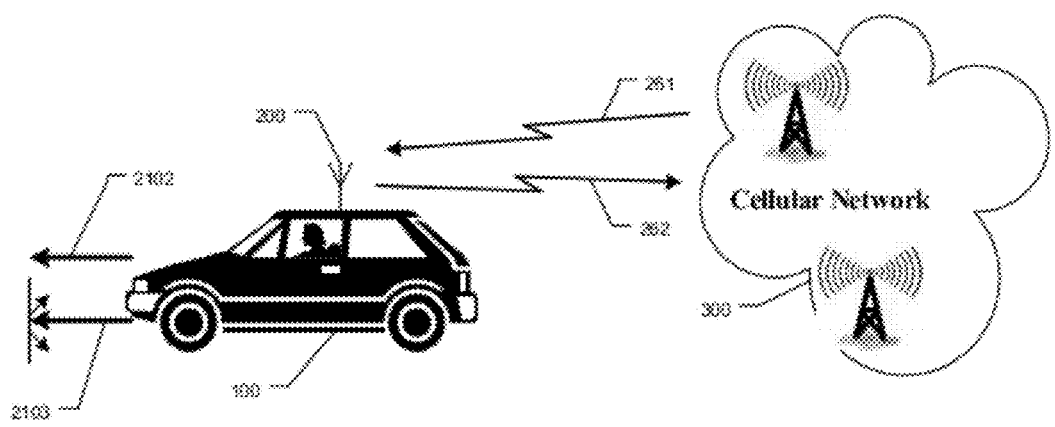
FIG. 1 is an exemplary application of safe driving system.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

The following is a glossary of terms used in the present application:

Mobile Terminal—In the context of this invention any of various mobile communication devices, such as: smart-phones, feature-phones, cellular-phones, embedded wireless modems, etc. intended for communication over the wireless WAN (cellular, broadband, etc.) networks.

Accelerometer—In the context of this invention, device measuring acceleration in X/Y/Z planes sometime equipped with measurement of magnetic field (magnetometer, gyroscope), usually in form of Microelectromechanical System (MEMS).

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, etc.; or a non-volatile memory such as a magnetic media, e.g., a hard drive, or optical storage. The memory medium may comprise other types of memory as well, or combinations thereof. In addition, the memory medium may be located in a first processor in which the programs are executed, or may be located in a second different processor which connects to the first processor over a network, such as wireless PAN or WAN network or the Internet. In the latter instance, the second processor may provide program instructions to the first processor for execution. The term "memory medium" may include two or more memory mediums which may reside in different locations, e.g., in different processors that are connected over a network.

Application—the term "application" is intended to have the full breadth of its ordinary meaning. The term "application" includes: 1) a software program which may be stored in a memory and is executable by a processor; or 2) a hardware configuration program useable for configuring a programmable hardware element.

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, Visual C, Java, assembly language, etc.; graphical programs (programs written in graphical programming languages); assembly language programs; programs that have been compiled to machine language; scripts; and other types of executable software. A software program may comprise two or more software programs that interoperate in some manner.

Computer System—any of various types of computing or processing systems, including cell phone, personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Text Message—in the context of this invention, any message (SMS, MMS, web browsing, etc.) requiring a textual interaction with the mobile terminal.

Voice Call—in the context of this invention, any voice communication between the mobile terminal and cellular network.

Driving Supervisor—in the context of this invention, any person or computer system authorized to receive remote alarms, notification or transmission of monitored user.

User—in the context of this invention, person supervised by the safe driving application.

Operator of the Vehicle—in the context of this invention, person actively involved in controlling of the moving vehicle, such as: car, track, bus, train, boat, etc. WAN, MAN, PAN—in the context of this invention: Wireless Access Network, Metropolitan Access Network, Personal Access Network, a wireless networks providing communication over their respective coverage area.

QR Code (Quick Response Code)—in context of this invention, such two-dimensional code which contains vehicle configuration information and may contain preprogrammed references such as, but not limited to: vehicle operation rules, employment and/or insurance contract conditions, local laws related to vehicle operations, information of actions in case of non-compliance, etc.

DESCRIPTION OF PREFERRED EMBODIMENT

The proposed method leverages on the functionality of accelerometers and gyroscopes available in most mobile terminals. In the common implementation such accelerometers are used for various user interface (UI), such as: mobile terminal screen orientation; detection of "finger tapping", gesture recognition, etc.

Acceleration (including translational movement) measures the change in velocity per unit of time, and is measured in meters per second squared ($m/s^2$). Velocity, expressed in meters per second (m/s), includes both the rate of displacement and direction of movement. Furthermore, if we consider acceleration over various periods of time then vibration can be thought of as acceleration and deceleration that happens quickly and in a periodic manner, while shock is acceleration that occurs instantaneously but, unlike vibration, it is a non-periodic function that typically happens once.

Considering the above, by observing the acceleration in X/Y/Z planes (vectors), over the specific period of time, one skilled in art may easily obtain the object velocity and forces (such as shock due to an impact during an accident) applied to such object.

As information about the vehicle operator status may be obtained through the interaction with the user using mobile terminal UI or automatically, or if the vehicle and the mobile terminals are equipped with near field communication (NFC), or RFID, or Bluetooth etc. and association of the vehicle with the operator through for example: acceptance of terms-and-conditions embedded in the vehicle QR code, one may use such knowledge with the vehicle velocity information to control the communication to/from the user. Furthermore, by detecting shock, information about the occurring accident, may be integrated into a comprehensive safe drive system.

Such system may be implemented in the form of application residing in the user mobile terminal connected to the wireless WAN, such as cdma2000, WCDMA, LTE, WiMax, etc., and consequently to the Internet. An example of such system is presented in FIG. 1 and FIG. 2.

Figure 2:
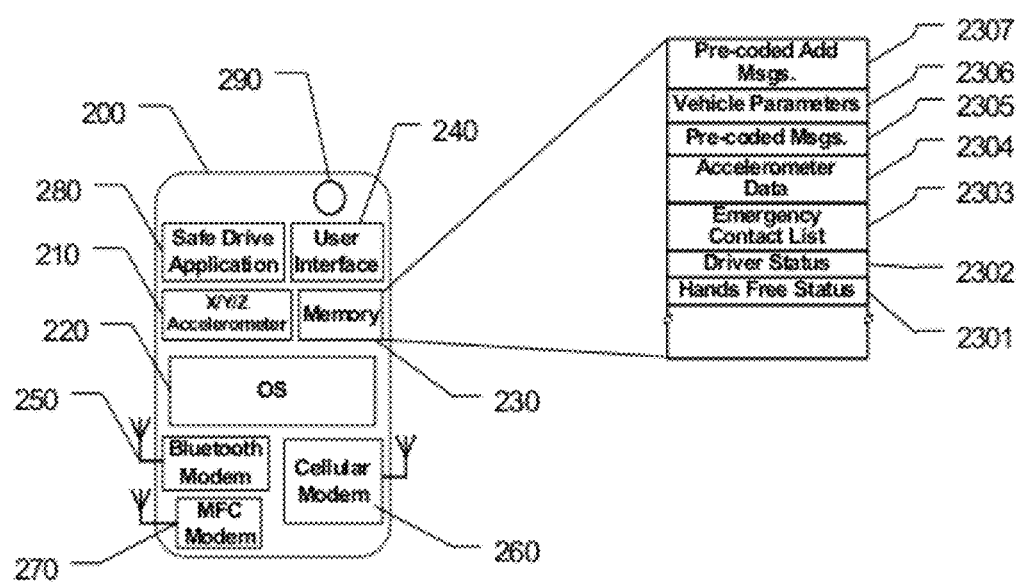
FIG. 2 is an exemplary block diagram of a mobile terminal with safe driving system.

The system of FIG. 1 and FIG. 2 consists of a vehicle 100, wireless mobile terminal 200 which resides within the vehicle and communicates with the wireless access network (WAN) over the downlink RF channel 261 and the uplink RF channel 262.

The mobile terminal 200 may include any type of device to communicate with wireless cellular network, such as: cellphones (including smart phones), personal digital assistants (PDAs) with mobile communication capabilities, wireless modem integrated into vehicle, laptops or computer systems with mobile communication components, and/or any device which is operable to communicate with a cellular network. The mobile terminal may use various different communication protocols, e.g., cdma2000 (1xRTT and EV-DO), UMTS, LTE, WiMax, or others).

Furthermore, the wireless terminal 200 consists of accelerometer function 210 which is controlled by the mobile terminal operating system (OS) 220, a memory subsystem 230, a user interface (UI) 240, a personal area network (PAN) modem function 250, such as Bluetooth, etc. to provide communication with the hands-free equipment, a wireless modem function providing communication to/from wireless WAN network 260, an NFC modem 270 to provide near field communication for driver verification function, and a safe driving application 280, and a phone camera 290.

The safe drive application 280 through mobile terminal OS 220 monitors the status of the hands-free function and periodically requests measure of acceleration along X, Y, and Z axes of motion from the mobile terminal accelerometer 210. From the X/Y/Z vectors, application calculates mobile terminal velocity 2102 and a shock 2103 values and store those values in their respective memory area. In addition, such application allows for scanning and extraction of various information from a QR (Quick Response) code. Among the others, such information may be equipment or user status, rules regulating vehicle operation, vehicle rental contract, fleet or insurance provider contacts, etc.

The first such information, 2301, contains the hands-free status and is stored in the mobile terminal memory 230 and is valid from the time of first association of such functionality until the communication link with such functionality is terminated.

The second such information, 2302, contains the driver status and is stored in the mobile terminal memory 230 and valid until the velocity of the vehicle is "0" mph and the driver_valid_timer $T_{DV}$ expires.

The third such information, 2303, contains user parameters, such as: emergency and insurance contact lists, $T_{DV}$ timer value, etc. and is stored in the mobile terminal memory 230.

The forth such information, 2304, contains data collected from the accelerometer and describing current status and the history of the vehicle speed.

The fifth such information, 2305, contains a set of pre-coded messages associated with the particular conditions under which such vehicle can be operated and an explicit acceptance of the vehicle operating rules—such as: train operator acknowledgement of regulations, car driver acceptance of insurance and/or rental company terms and conditions, etc. As the contracts, etc. terms may be very long and most likely exceeding the capacity of the QR code, such terms may be referred only as a "message number" in the QR code, 291, and the actual text of such contracts may be stored in the terminal memory 230 or retrieved from the issuer server over the wireless network.

The sixth such information, 2306, may contain description of the vehicle, for example: car, train, air-plain, etc. Such information is used to select application behavior and enable an appropriate device when the user enters the vehicle. For example: if the vehicle is a car, only the drive, hands-free and velocity status is considered; if the vehicle is a train, and the user is an operator of such vehicle (QR code in operator compartment), the application will disable all communication except designated emergency, but if the user is a passenger of a train (QR code, 291, may be inside train passenger compartment), application allows unrestricted communication regardless of vehicle velocity.

The seventh such information, 2307, may contain fleet or insurance management promotions and/or advertisement which may be send to the mobile terminal UI when the vehicle is not in motion or after the trip ended. Such info may contain promotional discounts based on the statistics of the trip, such as but not limited to: no attempts for "disallowed communication" detected, maintenance of allowable speed, etc.

To enhance user experience, information 2304, 2305, 2306 and 2307 may be embedded in QR code, 291, attached to the vehicle. It may be required to scan such QR code and accept included terms and conditions in order to enable application and vehicle operations. In addition, when the application is not already installed on user mobile terminal, such QR code provides facility for application download.

Figure 3:
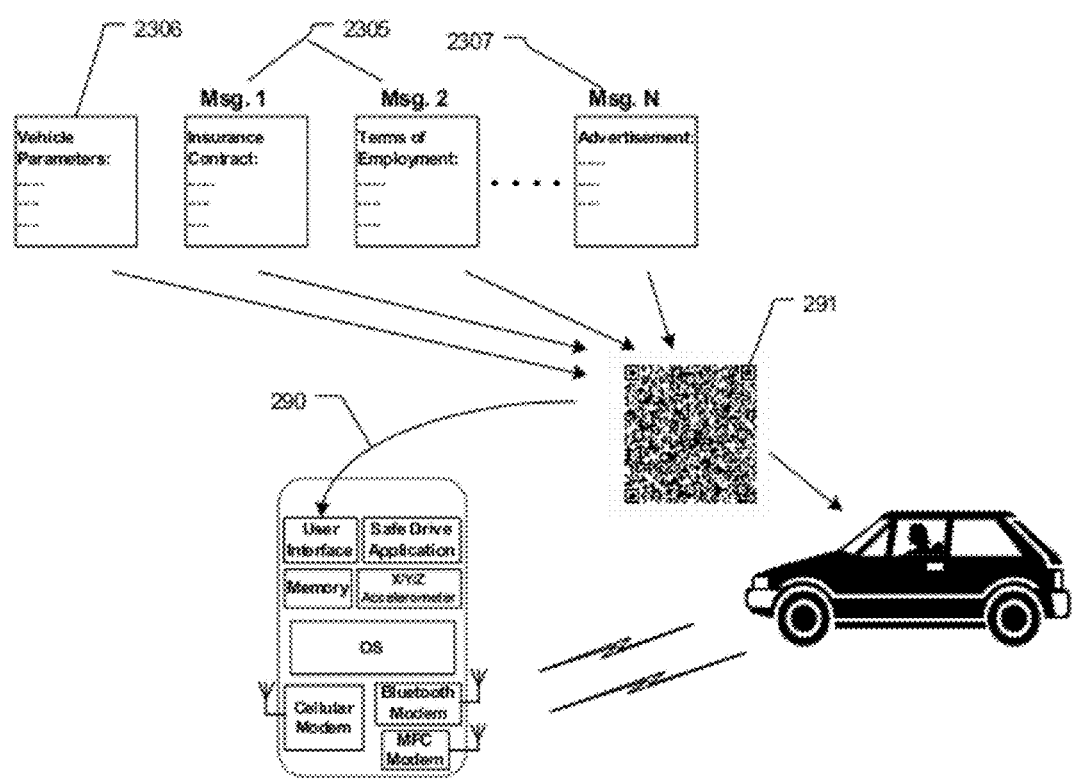
FIG. 3 is an exemplary method for establishing operator/vehicle association by using vehicle QR code.
Figure 4:
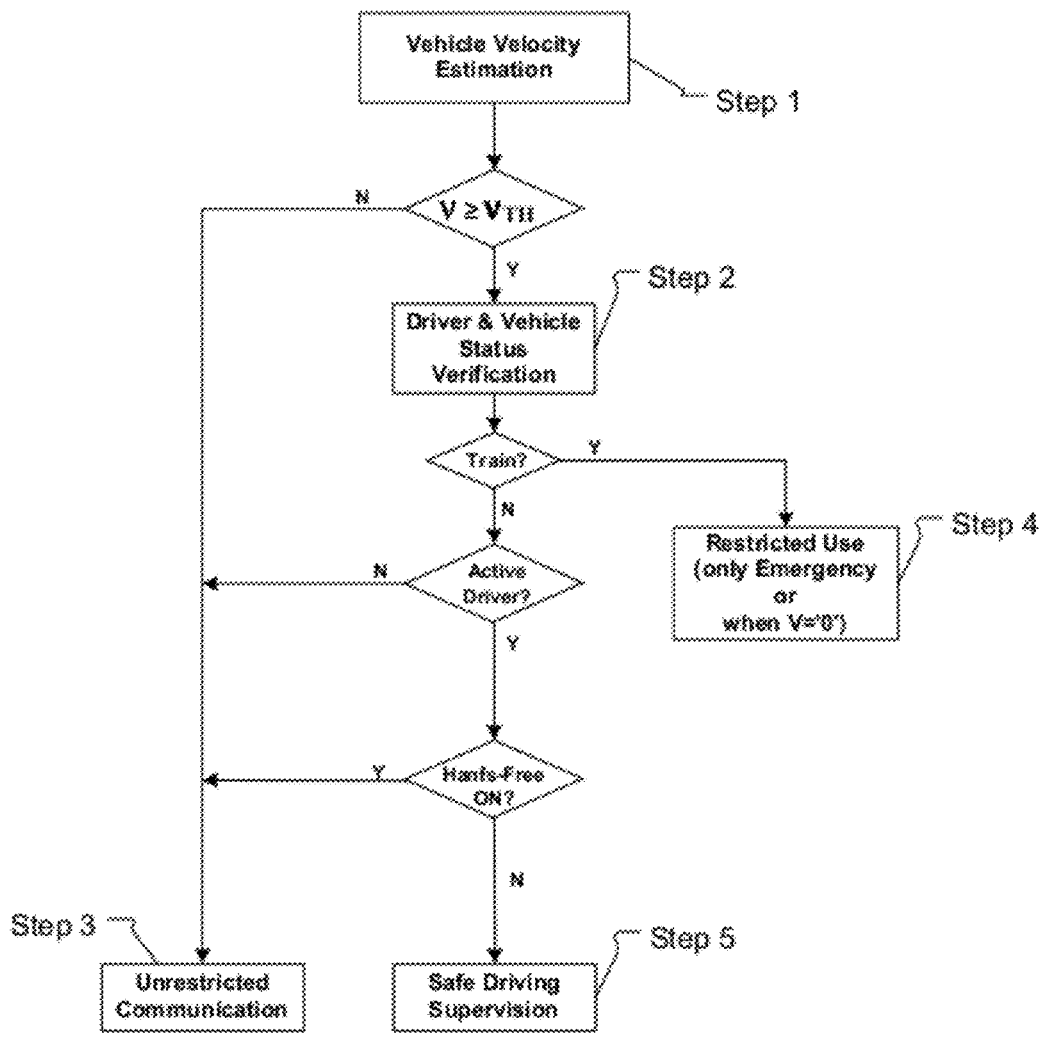
FIG. 4 is a flowchart of an exemplary method of driver verification process of the safe driving system.

When the QR code, 291, is scanned and terms and conditions are accepted, the information contained in this code is extracted and entered into the application data base (DB) and then used in conjunction with the other information, 2301, 2302 and velocity estimation, 2303, by the application supervision procedure as presented in FIG. 3.

Here, when the velocity status of the vehicle 2303 exceeds the predefined threshold, application enters Step 1 of the driver status verification process described in FIG. 3.

In Step 1, the vehicle velocity vector, $$v = \lim_{\Delta t \to 0} \frac{x(t+\Delta t) - x(t)}{\Delta t} = \frac{dx}{dt}.$$

is obtained from the mobile terminal MEMS accelerometer and the velocity V of the vehicle which starts with velocity u and then accelerates at rate a for a period of time $\Delta t$ is obtained as:

$$v = u + a\Delta t.$$

and the average velocity from:

$$\frac{(u+v)}{2}$$

which can be further filtered using IIR of FIR filtering function.

When the vehicle velocity exceeds a predefined threshold $v \geq v_{TH}$, for example 5 mph, the verification process enters Step 2.

In Step 2, the driver verification process communicates with the user over the mobile terminal UI, and request conformation if: a) the user of the terminal is actively involved in the driving of this vehicle; b) the vehicle is a train.

It has to be emphasized that the verification of the driver status may be obtained through the interaction with the user using mobile terminal UI or automatically, if the vehicle and the mobile terminals are equipped with near field communication (NFC) capabilities designed for such verification.

If the answers to item a and item b are yes (user is a driver of a train), the application enters Step 5 in which only an emergency communication, such as E911, pre-approved emergency contacts, etc. are allowed. Otherwise, the train velocity must be at "0' mph for a duration of $T_{DA}$ time, before unrestricted communication is allowed. Such unrestricted communication is suspended again when the velocity exceeds threshold $v \geq v_{TH}$.

If the answer to item a and item b are yes are no (user is a vehicle but the vehicle is not a train), the application enters Step 3.

In Step 2, application verifies if the vehicle actively operated by the user is equipped with hands-free functionality. If the hands-free (HF) functionality is on (mobile terminal was associated with vehicle hands-free device), the unrestricted communication is allowed, HF Status variable stored.

If the hands-free (HF) functionality is off (mobile terminal has no communication with the vehicle hands-free device), the application enters Step 4—in which only restricted and supervised communication is allowed.

Figure 5:
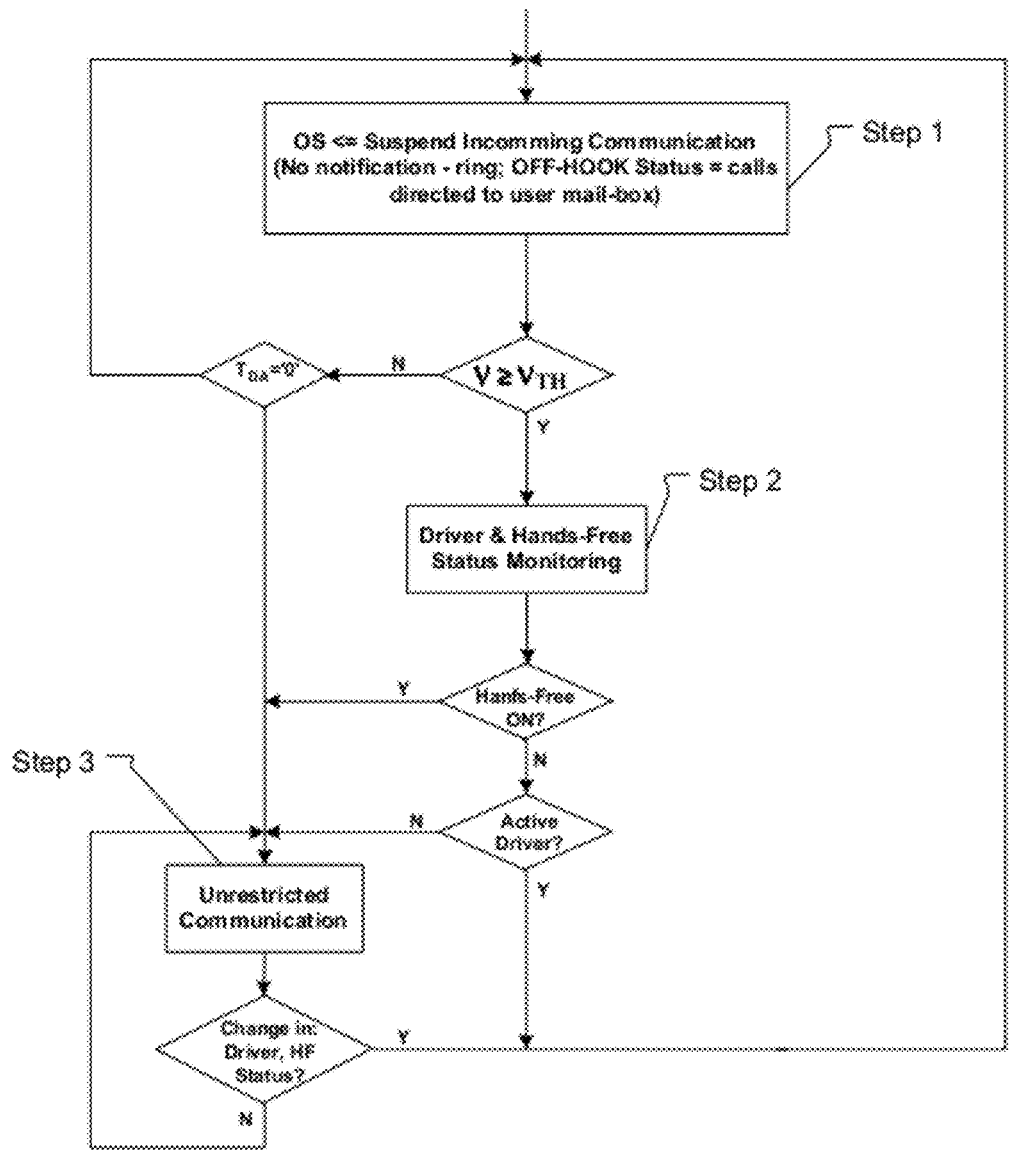
FIG. 5 is a flowchart of an exemplary method of the supervisory process of the safe driving system.

The safe driving supervision process is described below and in FIG. 5 and consists of several steps.

In Step 1, the application requests the mobile terminal OS to perform one or all of the following: a) disable incoming call notifications (ring, vibrate, etc.); b) set cellular phone function to OFF—similar as in the taking-off or landing airplane; c) set the cellular function to "busy", does forcing all incoming communication to the user mail-box, then enter Step 2.

In Step 2, the supervising procedure, among the others, continuously monitors the hands-free status 2301, the driver status 2302, and the vehicle velocity status 2303.

If the hands-free status changes to on (the mobile terminal become associated with the hands-free function), or the driver status changed to no (driver become the passenger—verified through transition from driving-to-stop, or the mobile terminal was handed over to the passenger of the vehicle), or the vehicle velocity is "0" mph for a duration of $T_{DA}$ time, the supervision process enters Step 3, does allowing unrestricted communication.

If the hands-free status if off (no hands-free function available), and driver status is yes (user is the active driver of the vehicle), and the vehicle velocity exceeds threshold $v \geq v_{TH}$, and the user intends to make a call other than E911 or to any number other than one from approved emergency contact list, the supervision procedures enters Step 4, sends communication disallowed message to the user UI, then returns to Step 2, otherwise, if the user intends to make E911 or to any number other than one from approved emergency contact list, the supervision procedures enters Step 3 and allows unrestricted communication.

At any time during verification and supervision process if the instantaneous acceleration (shock to impact), exceeds a predefined threshold $a \geq +a_{TH}$, does indicating an accident, the application records such occurrence, it's force, time and location, then depending on the user parameters sends such information over the wireless WAN network to the designated recipients, such as family members, insurance providers, E911 services, etc.

We claim:

1. A safe driving compliance system for suspending communication between a cellular network and a smart-phone of a driver of a vehicle, or communication originated/terminated by a passenger of the vehicle but continued by the smart-phone of the driver while the vehicle is in motion comprising:
    a smart-phone based safe driving compliance application;
    a quick response code (QR-code) assigned and attached to the vehicle; the QR-code containing terms and conditions for operating the vehicle; and wherein the smart-phone based safe driving compliance application is configured to scan said QR-code and to confirm driver acceptance of the terms and conditions for operating the vehicle through the smart-phone user interface (UI); said safe driving compliance application is further configured to establish communication with:
    the driver identification unit located inside the vehicle; and with the vehicle hands-free equipment;
    and to monitor the vehicle velocity measured by the smart-phone channel estimation function, and to monitor the hands-free communications equipment in the vehicle; and wherein said safe driving compliance application suspends all incoming and outgoing communication between the smart-phone of the driver of the vehicle and the cellular network based on the acceptance of the terms and conditions, when the vehicle is in motion and the smart-phone of the driver is not communicating through the vehicle hands-free communication equipment.

2. The safe driving compliance system of claim 1, wherein said safe driving application is configured to detect an accident by observing the instantaneous changes in acceleration vectors of the smart-phone accelerometer.

3. The safe driving compliance system of claim 1, wherein the verification of the vehicle velocity is obtained through the smart-phone channel estimation function.

4. A method for obtaining a vehicle related information by a safe driving compliance application stored on a smart-phone comprising:
    embedding the vehicle related information into a QR-code;
    attaching said QR-code to the vehicle; and
    scanning said information into the safe driving compliance application of the smart-phone, and wherein said information contains:

type of the vehicle including at least one of an automobile, a fleet vehicle, a train;
the vehicle hands-free capabilities;
the vehicle near field communications (NFC) capabilities;
the vehicle terms-of-use;
contact information of recipients of the vehicle terms-of-use violations;
and promotional materials.

5. The method of claim 4 wherein the vehicle terms-of-use embedded in the QR-code contains pre-coded information among others comprise of: references to the insurance contract; vehicle operating restrictions; and reference to the applicable laws restricting communication while actively operating the vehicle.

6. The safe driving compliance system of claim 5, wherein upon detection of an accident the safe drive compliance application sends an SMS message informing the selected recipients and collects all of the following information: vehicle speed at the time of the accident, location of the accident, intensity of the shock, the driver and the vehicle hands-free equipment status, then stores said information in the smart-phone memory.

7. The method of claim 4, wherein after scanning information contained in the QR-code, the safe driving application establishes communication with the NFC device to verify the status of the driver, and with the Bluetooth device to establish hands-free functionality, then sends status of said connection to the cellular network.

8. The method of claim 4, wherein information embedded in the QR-code and information processed by the safe driving application is used to determine driving violations including: vehicle operating conditions; attempts to make calls or send SMS while actively driving a vehicle, or by attempting to continue communication originated/terminated by passenger of the vehicle; and to send SMS message informing the recipients identified in the QR-code and to store time and location of said violation in the safe driving application memory.

9. The method of claim 4, wherein the promotional materials embedded in the QR-code are presented to the driver of the vehicle only when the vehicle is not in motion or when the recipient is not actively involved in operation of the vehicle.

10. A safe driving compliance system for supervising of safe driving, comprising: a safe driving compliance application stored on a smart-phone consisting a plurality of parameters associated with and corresponding to a vehicle and included into a QR-code attached to the vehicle; and wherein the plurality of the parameters include all of the following:
type of the vehicle including at least one of an automobile, a fleet vehicle, a train;
the vehicle hands-free communication equipment capability;
the vehicle near field communication (NFC) capability;
the vehicle terms-of-use;
emergency and insurance company contact list containing plurality of recipients of violation or accident reports; and
wherein said parameters in conjunction with the vehicle speed information are used by the safe driving compliance application to suspend all incoming and outgoing communication between the smart-phone of a driver of the vehicle and cellular network when the vehicle is in motion and the smart-phone of the driver is not communicating through the vehicle hands-free communication equipment.

11. A non-transitory computer accessible memory medium for storing program instruction of a safe driving compliance application system, wherein the program instructions performs all of the following:
obtaining information related to a vehicle by scanning a QR-code attached to the vehicle;
establishing communication between driver identification unit installed inside the vehicle and a near field communication (NFC) transceiver of a smart-phone of a driver of the vehicle;
establishing communication between the vehicle hands-free equipment and the smart-phone Bluetooth transceiver;
obtaining the vehicle velocity by analyzing output of the smart-phone channel estimation function;
detecting occurrence of an accident by analyzing instantaneous change in acceleration vector measured by the smart-phone accelerometer;
suspending, based on the information, communication originated or terminated by the smart-phone of the driver of the vehicle, or originated or terminated by a passenger of the vehicle but continued by the driver while the vehicle is in motion, based on the vehicle velocity and the acceleration vector, and said communication is not conducted using the vehicle hands-free communication equipment;
and sending report of violation or an accident, based on the vehicle velocity and the acceleration vector, to recipients of the violation reports in a SMS messages.

* * * * *